July 23, 1968 — E. BURHOP — 3,393,706

PLURAL ACTUATOR MIXING TAP

Filed Jan. 27, 1966 — 2 Sheets-Sheet 1

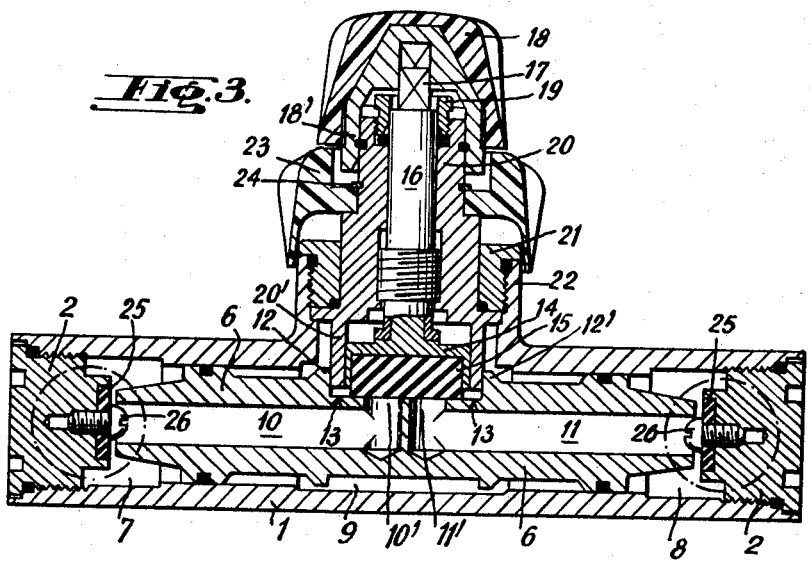
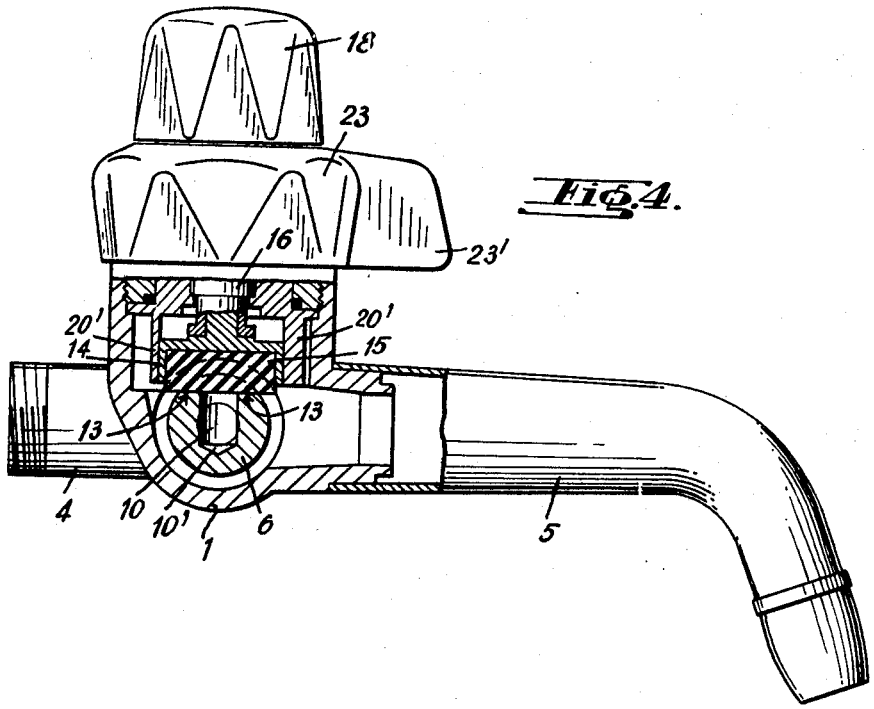

United States Patent Office 3,393,706
Patented July 23, 1968

3,393,706
PLURAL ACTUATOR MIXING TAP
Emil Burhop, St. Annastrasse 44,
Lucerne, Switzerland
Filed Jan. 27, 1966, Ser. No. 523,452
3 Claims. (Cl. 137—637.2)

The present invention has for object a mixing tap comprising a hollow body the inside of which is respectively connected to a hot water and cold water supply, and an intermediate outlet spout.

The mixing tap according to the invention is characterised in that it comprises a piston disposed in a cylindrical cavity of said body and each end of which extends into a cold water chamber and a hot water chamber, into which issue the above-mentioned corresponding supplies and the middle portion of which is surrounded by a mixture chamber communicating with the outlet spout, two passages being provided inside this piston between each of its ends and the said middle portion of the piston, a valve controlling the simultaneous opening and closing of the outlet of the two passages into said chamber to control the output of the tap, a cam cooperating with the piston to control its axial movement between a closing position of one of its ends against a corresponding joint and an opening position of its two ends, and two outer operating knobs for respectively actuating the valve with a view to putting into and out of communication the said passages with the mixing chamber, and the cam to adjust the output and the proportion of hot and cold water.

The accompanying drawing shows, by way of example, one embodiment of the mixing tap object of the present invention.

Figure 1:
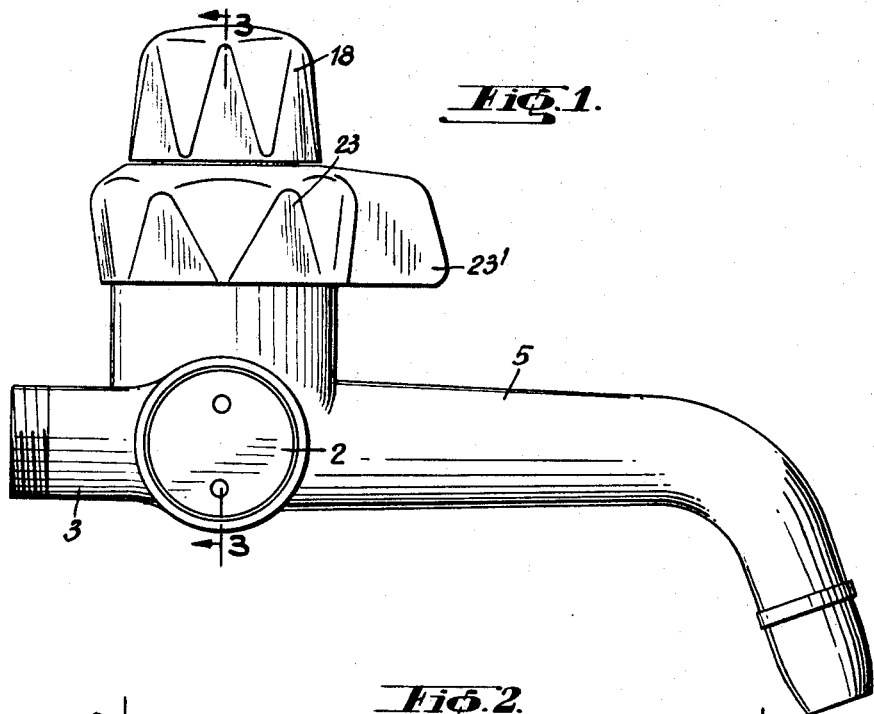
Figure 2:
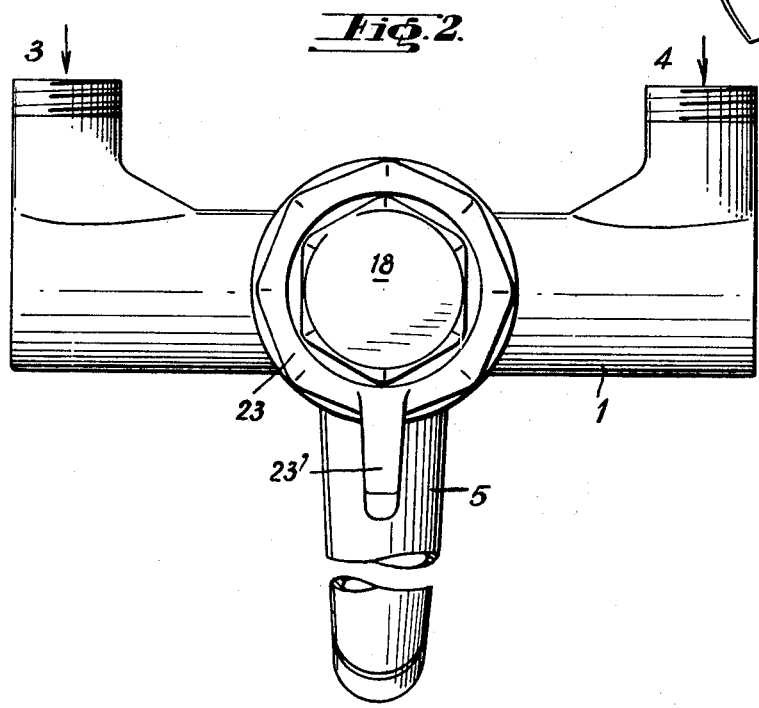

FIG. 1 is a view in side elevation of the tap.
FIG. 2 is a plan view thereof.
FIG. 3 is a section along line 3—3 of FIG. 1.
FIG. 4 is a view similar to FIG. 1 but showing the inner members in section.

The mixing tap shown comprises a cylindrical hollow body 1 of which the ends closed by screwed plugs 2, are respectively connected to a supply of cold water 3 and a supply of hot water 4. An outlet spout 5 is branched on the cylindrical body 1 between its two ends. Inside this cylinder 1 is mounted a piston 6 each end of which extends into a cold water chamber 7 and a hot water chamber 8 respectively, the middle portion of the piston 6 being surrounded by a mixing chamber 9 communicating with the outlet spout 5. Two passages 10 and 11 are provided in the piston 6 between each of its ends and its middle portion where each passage issues perpendicularly to the axis of the piston at 10' and 11' respectively. This middle portion is machined so as to offer two annular shoulders 12, 12' and a flat bearing 13 where the passages 10' and 11' emerge. A valve 14 including a joint lining 15 carried by a threaded rod 16 controls the simultaneous opening or closing of the outlet of the two passages 10' and 11' into the mixing chamber 9 to regulate the output of the tap. The end of the threaded rod 16 has a square section 17 on which is mounted an operating knob 18 held by means of a spring 18. A stuffing-box 19 is disposed between the rod 16 and a sleeve 20 into which this rod screws and the lower end of which extends around the valve 14 between the shoulders 12, 12' of the piston 6. This end of the sleeve 20 has an eccentric portion 20' forming a cam and adapted to cooperate with one of the shoulders 12, 12' to control the axial movement of the piston 6 regulating the proportion of hot water and cold water as will be described hereafter. The sleeve 20 is mounted in a collar 21 screwed in a tubular portion 22 of the cylindrical body 1 with the interposition of O-ring joints as shown. An operating knob carrying a pointer 23' is fitted to the sleeve 20 on which it is held by a circlip 24, this knob 23 serving to rotate the sleeve with its eccentric around its axis.

The plugs 2 of the ends of the cylindrical body 1 each carry a joint 25 secured by means of a screw 26 and against which the corresponding end of the piston 6 may bear.

Although in the embodiment shown the axis of the operating knobs 18, 23 is vertical that is to say perpendicular to the axis of the spout 5, it could be inclined forwardly relative to this spout.

The operation of the mixing tap described is the following:

When the user wishes to have hot water only, he turns the operating knob 23 to a position set by the pointer 23', such that the eccentric 20 bears against the annular shoulder 12 and moves the left-hand end (FIG. 3) of the piston 6 against the joint 25 thus closing the cold water passage 10, 10'. Alone the right-hand end of the piston 6 is open and the passage 11, 11' communicating with the chamber 8 is filled with hot water. The user then turns the operating knob 18 to raise the valve 14 from its seat formed by the bearing 13 thus opening the outlet of the passages 10', 11' and permitting the hot water to flow into the chamber 9 and then through the spout 5.

In order to have a mixture of hot and cold water in equal proportions, for example, the user turns the knob 23 into a position set by the pointer 23' and which corresponds to the position of the piston 6 such as shown in FIG. 3 where the two ends of this piston are open, that is to say spaced from the joints 25. In this position, the two passages 10' and 11' respectively communicate with the hot and cold water chambers 7 and 8 and by raising the valve 14 these passages are opened so that the mixing chamber 9 receives simultaneously cold and hot water in the desired proportion. The output of the mixture flowing through the spout 5 may thus be adjusted by means of the valve 14.

The mixing tap described has the advantage of permitting an adjustment of the proportion of hot and cold water independently of the adjustment of the output. When the tap is closed, there cannot be any mixture of hot and cold water, due to the simultaneous closing of the outlet of the passages for the supply of water to the mixing chamber.

Further, the tap described is of particularly simple construction and operation.

What I claim is:
1. A mixing tap comprising a hollow body the inside of which is connected to a supply of hot water and cold water respectively, and an intermediate outlet spout, characterised in that it comprises a piston disposed in a cylindrical cavity of this body and each end of which extends into a cold water and a hot water chamber respectively, into which issue the above-mentioned corresponding supplies, and the middle portion of which is surrounded by a mixing chamber communicating with the outlet spout, two passages being provided inside this piston between each of its ends and the said middle portion of the piston, a valve controlling the simultaneous opening and closing of the outlet of the two passages into said chamber to adjust the output of the tap, a cam cooperating with the piston to control its axial movement between a closing position of one of its ends against a corresponding joint and an opening position of its two ends, and two outer operating knobs for respectively operating the valve, with a view to putting the said passages into and out of communication with the mixing chamber, and the cam, in order to adjust the output and the proportion of the mixture of hot and cold water.

2. Tap according to the claim 1, characterised in that the output adjusting valve includes a joint lining carried by a threaded rod the end of which has a square section on which is mounted the knob for actuating the said valve, in that the said cam is formed by an eccentric portion of the end of a sleeve surrounding the valve rod and in which this rod is screwed, the cam operating knob being fixed on said sleeve so as to cause it to rotate.

3. Tap according to claim 2, characterised in that the cam operating knob carries a pointer permitting of setting the position of the cam so as to obtain the desired proportion of the hot and cold water mixture.

References Cited

UNITED STATES PATENTS

| 2,601,053 | 6/1952 | Ovary | 137—637.4 |
| 2,614,851 | 10/1952 | Parker | 137—637.2 |

CLARENCE R. GORDON, *Primary Examiner.*